(12) United States Patent
Gao et al.

(10) Patent No.: US 12,248,141 B2
(45) Date of Patent: Mar. 11, 2025

(54) FRAME SYNCHRONIZATION METHOD FOR SCANNING GALVANOMETER AND LIDAR

(71) Applicant: Hesai Technology Co., Ltd., Shanghai (CN)

(72) Inventors: Yongfeng Gao, Shanghai (CN); Shaoqing Xiang, Shanghai (CN)

(73) Assignee: Hesai Technology Co., Ltd., Shanghai (CN)

( * ) Notice: Subject to any disclaimer, the term of this patent is extended or adjusted under 35 U.S.C. 154(b) by 489 days.

(21) Appl. No.: 17/738,358

(22) Filed: May 6, 2022

(65) Prior Publication Data

US 2022/0260828 A1 Aug. 18, 2022

Related U.S. Application Data

(63) Continuation of application No. PCT/CN2020/133534, filed on Dec. 3, 2020.

(30) Foreign Application Priority Data

Dec. 30, 2019 (CN) .......................... 201911395881.0

(51) Int. Cl.
- *G02B 26/08* (2006.01)
- *G01S 7/481* (2006.01)
- *G02B 26/10* (2006.01)

(52) U.S. Cl.
CPC .......... *G02B 26/105* (2013.01); *G01S 7/4817* (2013.01)

(58) Field of Classification Search
CPC ... G02B 26/105; G02B 26/127; G01S 7/4817; G01S 13/931; G01S 13/865; G01S 17/86; G01S 17/931
See application file for complete search history.

(56) References Cited

U.S. PATENT DOCUMENTS

| 2019/0011695 A1 | 1/2019 | Amor et al. |
| 2020/0159008 A1* | 5/2020 | Sakurai ................ G02B 26/085 |

FOREIGN PATENT DOCUMENTS

| CN | 104977786 A | 10/2015 |
| CN | 108594869 A | 9/2018 |

(Continued)

OTHER PUBLICATIONS

Patent Cooperation Treaty, International Search Report, International Application No. PCT/CN2020/133534 (Feb. 25, 2021).

(Continued)

*Primary Examiner* — Euncha P Cherry
(74) *Attorney, Agent, or Firm* — Leydig, Voit & Mayer, Ltd.

(57) ABSTRACT

A frame synchronization method for a scanning vibrating mirror and a lidar are provided. The method includes: obtaining current parameters of a reference signal, where the parameters of the reference signal include a reference signal period and a current first phase; obtaining signal parameters of a frame scanning signal along a first rotation axis of the vibrating mirror, where the signal parameters include a frame scanning period and a current second phase; determining a phase difference between the reference signal and the frame scanning signal based on the current parameters of the reference signal and the signal parameters of the frame scanning signal of the current scanning period; and determining a scanning duration of a first scanning stage of the frame scanning signal in a next scanning period based on the phase difference. Accordingly, an actual frame scanning period of the scanning vibrating mirror tracks and synchronizes with external frame signals.

14 Claims, 3 Drawing Sheets

(56) References Cited

FOREIGN PATENT DOCUMENTS

| | | |
|---|---|---|
| CN | 109584761 A | 4/2019 |
| CN | 109587461 A | 4/2019 |
| CN | 109788264 A | 5/2019 |

OTHER PUBLICATIONS

Patent Cooperation Treaty, Written Opinion of the International Searching Authority, International Application No. PCT/CN2020/133534 (Feb. 25, 2021).

\* cited by examiner

FRAME SYNCHRONIZATION METHOD FOR SCANNING GALVANOMETER AND LIDAR

CROSS-REFERENCE TO RELATED APPLICATIONS

This application is a continuation of International Patent Application No. PCT/CN2020/133534, filed on Dec. 3, 2020, which claims priority to and the benefit of Chinese Patent Application No. 201911395881.0, filed on Dec. 30, 2019, which is incorporated herein by reference in its entirety.

TECHNICAL FIELD

Embodiments of this disclosure relate to the field of laser detection, and in particular, to a frame synchronization method for a scanning vibrating mirror and a lidar.

BACKGROUND

A lidar can detect a relative distance between a target and a location of the lidar (for example, a vehicle, a low-altitude flying helicopter, a fixed detection device, or the like), and collect information such as three-dimensional coordinates and the reflectivity of a large quantity of dense points on a surface of the detected target, to reconstruct a three-dimensional model of the detected target.

A vibrating mirror is usually used by a solid-state lidar to emit incident laser beams and receive echo laser beams. The vibrating mirror may include a fast axis and a slow axis. During operation of the solid-state lidar, the fast axis of the vibrating mirror is usually in a resonance state. A resonant frequency of the fast axis of the vibrating mirror may change due to temperature change and device aging. To ensure the temperature of a scanning trajectory, a scanning frequency of the slow axis of the vibrating mirror may be adjusted, so that a frame scanning frequency achieved by rotation of the slow axis and the resonant frequency of the fast axis may shift together.

SUMMARY

This disclosure provides a frame synchronization method for a scanning vibrating mirror and a lidar. A frame scanning signal of the scanning vibrating mirror is divided into an effective scanning period and an ineffective scanning period, and the frame scanning signal of the scanning vibrating mirror is synchronized with external reference frame signals by adjusting the duration corresponding to the ineffective scanning period, so that a frequency of the frame scanning signal is simultaneously matched with both a frequency of a line scanning signal of the scanning vibrating mirror and a frequency of the external reference frame signals. The frame scanning signal may be kept synchronized with external periodic signals while a frame scanning trajectory and a frame scanning frequency of the frame scanning signal are being kept stable.

In a first aspect, an embodiment of this disclosure provides a frame synchronization method for a scanning vibrating mirror, including: obtaining current parameters of a reference signal, where the parameters of the reference signal include a reference signal period and a current first phase; obtaining signal parameters of a current scanning period of a frame scanning signal of the scanning vibrating mirror along a first rotation axis of the scanning vibrating mirror, where the signal parameters of the frame scanning signal include a frame scanning period and a current second phase; determining a phase difference between the reference signal and the frame scanning signal based on the current parameters of the reference signal and the signal parameters of the frame scanning signal of the current scanning period; and determining a scanning duration corresponding to a first scanning stage of the frame scanning signal in a next scanning period based on the phase difference, so that the frame scanning signal of the next scanning period tend to be synchronized with the reference signal, where the frame scanning signal includes a first scanning stage and a second scanning stage, and the respective scanning durations corresponding to the first scanning stage and the second scanning stage are integer multiples of a resonant period of a resonant scanning signal of the scanning vibrating mirror along a second rotation axis of the scanning vibrating mirror.

In a second aspect, an embodiment of this disclosure provides a lidar, including a vibrating mirror for scanning. The lidar synchronizes the frame scanning signal of the vibrating mirror for scanning with frame signals of other sensors cooperating with the lidar by performing the frame synchronization method for a scanning vibrating mirror described in the first aspect.

By using the frame synchronization method for a scanning vibrating mirror and the lidar provided in the embodiments of this disclosure, a frame scanning signal of the vibrating mirror for scanning is divided into an effective scanning period and an ineffective scanning period, and the frame scanning signal of the vibrating mirror for scanning is synchronized with external reference frame signals by adjusting the duration corresponding to the ineffective scanning period, so that a frequency of the frame scanning signal is simultaneously matched with both a frequency of a line scanning signal of the vibrating mirror for scanning and a frequency of the external reference frame signals.

BRIEF DESCRIPTION OF THE DRAWINGS

Other features, objectives, and advantages of this disclosure become more obvious by reading the detailed description of non-limiting embodiments that are provided with reference to the following accompanying drawings.

DETAILED DESCRIPTION

This disclosure is further described in detail below with reference to the accompanying drawings and embodiments. It may be understood that specific embodiments described herein are only used to explain a related invention, but not to limit the invention. Additionally, it should be noted that, for ease of description, the accompanying drawings only show parts relevant to the related invention.

It should be noted that the embodiments in this disclosure and features in the embodiments may be combined with each other in the case of no conflict. This disclosure is described in detail below with reference to the drawings and the embodiments.

Figure 1:
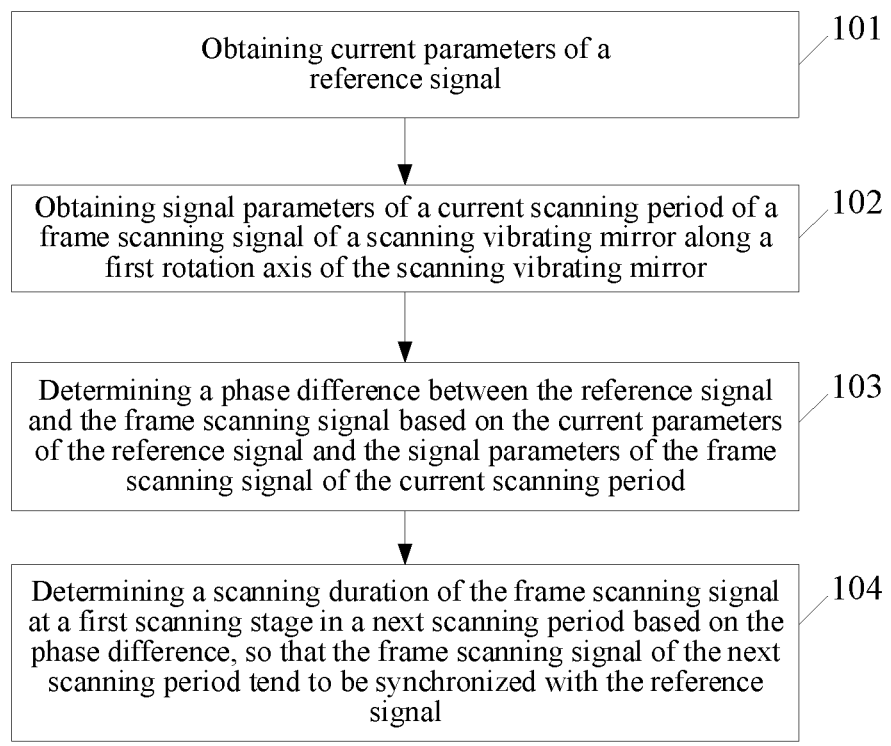
FIG. 1 is a schematic flowchart of a frame synchronization method for a scanning vibrating mirror according to an embodiment of this disclosure.

Referring to FIG. 1, FIG. 1 shows a schematic flowchart of a frame synchronization method for a scanning vibrating mirror according to an embodiment of this disclosure.

As shown in FIG. 1, the frame synchronization method for a scanning vibrating mirror includes the following steps:

Step 101: Obtaining current parameters of a reference signal.

The parameters of the reference signal include a reference signal period and a current first phase. The reference signal period refers to a duration of a period of the reference signal. The current first phase refers to a current phase of the reference signal and is used to be distinguished from a current phase of a candidate frame scanning signal of a vibrating mirror for scanning.

The reference signal may be a signal used for the synchronization among frame signals of sensors other than the vibrating mirror for scanning, such as the frame signal of a camera or frame signals of other radars. In addition, the reference signal may also act as a third-party clock signal used for synchronizing a frame signal of the scanning vibrating mirror with frame signals of other sensors.

When the lidar is applied to an autonomous vehicle, the lidar needs to cooperate with other sensors to determine an obstacle ahead. In other words, the lidar and original data of the other sensors need to be fused. During cooperation of the lidar and the other sensors, a frequency (period) of a signal acquired by the lidar needs to match a frequency (period) of a signal acquired by the other sensors.

A main component of a solid-state lidar related to a signal acquisition frequency is a vibrating mirror for scanning. The vibrating mirror for scanning includes a fast axis and a slow axis. When the solid-state lidar is in a scanning state, the fast axis is usually operated in a resonant mode and may be used for line scanning. The line scanning may be performed horizontally in a reciprocal manner.

The slow axis is usually operated in a non-resonant mode and may be used for frame scanning. The frame scanning may be performed vertically in a reciprocal manner.

In addition, the line scanning may also be performed vertically in a reciprocal manner. The frame scanning may also be performed horizontally in a reciprocal manner.

In other words, a scanning direction of the line scanning may be perpendicular to a scanning direction of the frame scanning.

The fast axis of the scanning vibrating mirror used for the lidar is usually operated in the resonant mode. The resonant mode has advantages of high frequency, high gain, and low consumption. However, the resonant mode has a problem that a resonant frequency may change due to temperature change and device aging. In the prior art, to ensure a stable scanning trajectory, the stability of a frame frequency is sacrificed, so that the frame frequency shifts according to a pre-determined ratio of the resonant frequency.

However, since most of the other sensors may generate data in a fixed frame frequency, such method may limit the lidar in the disclosure of a multi-sensor data fusion.

The frame synchronization method provided in this disclosure may be used to resolve the problem described above.

Step 102: Obtaining signal parameters of a current scanning period of a frame scanning signal of the scanning vibrating mirror along a first rotation axis of the scanning vibrating mirror.

The signal parameters of the frame scanning signal include a frame scanning period and a current second phase of the frame scanning signal.

The first rotation axis may be the slow axis of the vibrating mirror for scanning. The vibrating mirror for scanning may further include a second rotation axis. The second rotation axis may be the fast axis of the vibrating mirror for scanning. The first rotation axis and the second rotation axis may be perpendicular to each other. A vibrating mirror for scanning may be presently operated in a resonance state along a second rotation axis of the vibrating mirror for scanning.

The current scanning period of the frame scanning signal of the scanning vibrating mirror along the first rotation axis of the scanning vibrating mirror refers to a duration corresponding to a scanning period of the frame scanning signal in a current operating state of the scanning vibrating mirror. That is, a duration corresponding to a scanning period of the frame scanning signal at a current temperature in a current operating state of the vibrating mirror for scanning. The duration may be determined by counting the number of reciprocations by the frame scanning signals of the scanning vibrating mirror within a preset time period.

The second phase of the frame scanning signal may be a phase of the frame scanning signal in a current scanning period.

In this embodiment, the scanning period of the frame scanning signal may be set as an integer multiple of a resonant period of a line scanning signal (resonant scanning signal) of the vibrating mirror for scanning. The integer multiple may be set to, for example, 5 times, 10 times, 20 times, and the like. The integer multiple may be set according to an actual application scenario. This is not limited herein.

Step 103: Determining a phase difference between the reference signal and the frame scanning signal based on the current parameters of the reference signal and the signal parameters of the frame scanning signal of the current scanning period.

Generally, during initial setting, a frame period of the reference signal may be the same as a frame period of the vibrating mirror for scanning. When the fast axis of the vibrating mirror for scanning is operated in the resonant mode, a resonant period of the fast axis may change due to temperature change and device aging in the resonant mode. However, the frame period of the reference signal usually remains unchanged. The frame scanning signal of the vibrating mirror for scanning will not match a frame period of external reference signals if the frame scanning period of the frame scanning signal of the vibrating mirror for scanning is adjusted to match the resonant period of the fast axis. If the frame scanning period of the frame scanning signal of the vibrating mirror for scanning remains unchanged, the frame scanning signal can match the frame period of the external reference signals. However, a quantity of scanning lines (that is, scanning trajectories) respectively included in a plurality of frame scanning signals of the vibrating mirror for scanning may be different.

To enable the frame scanning period of the vibrating mirror for scanning to match both the resonant period and the frame period of the reference signal, in this embodiment, the frame scanning period of the frame scanning signal may be divided into a first scanning stage and a second scanning stage.

In some optional implementations, before step 101, the foregoing frame synchronization method for a scanning vibrating mirror further includes the following steps:

Step 1: Dividing the frame scanning period of the scanning vibrating mirror into a plurality of resonant periods.

Step 2: Dividing the frame scanning period of the scanning vibrating mirror into a first scanning stage and a second scanning stage.

Both the first scanning stage and the second scanning stage include the plurality of resonant periods. A scanning duration corresponding to the second scanning stage is fixed as a preset multiple of the resonant period of the scanning vibrating mirror. The first scanning stage performs scanning along a first scanning direction, the second scanning stage performs scanning along a second scanning direction, and the first scanning direction is opposite to the second scanning direction.

The respective scanning durations corresponding to the first scanning stage and the second scanning stage are integer multiples of a resonant period of a resonant scanning signal of the scanning vibrating mirror along a second rotation axis of the scanning vibrating mirror.

A ratio between the duration corresponding to the second scanning stage of the frame scanning signal of the scanning vibrating mirror and the resonant period may be set to remain unchanged. In other words, the scanning duration corresponding to the second scanning stage of the frame scanning signal may be set to a multiple K of the resonant period and remain unchanged. Since the resonant period may not change in a short term, the scanning duration corresponding to the second scanning stage may also be considered to remain unchanged in a short term. Since a value of K corresponding to an effective scanning stage remains unchanged, waveforms of all frames at the effective scanning stage are consistent during generation of a frame scanning reference waveform. The scanning trajectory of the effective scanning stage may remain consistent from frame to frame based on servo control, so that the trajectory can be stable.

The second scanning stage may be set as an effective scanning stage, and the first scanning stage may be set as an ineffective scanning stage. Using an example in which the frame scanning signal of the vibrating mirror for scanning is scanned vertically in a reciprocal manner, for each frame of the frame scanning signal, the second scanning stage of the frame scanning signal may be, for example, a stage at which the frame scanning signal is scanned from top to bottom; and the first scanning stage may be, for example, a stage at which the frame scanning signal of the vibrating mirror for scanning is scanned from bottom to top. In addition, the first scanning stage of the frame scanning signal may also be a stage at which the frame scanning signal is scanned from top to bottom; and the second scanning stage may also be, for example, a stage at which the frame scanning signal of the vibrating mirror for scanning is scanned from bottom to top.

The second scanning stage is set as the effective scanning stage, which means that during detection of external signals, a signal of the frame scanning signal detected at the second scanning stage is used as an effective detection signal. The duration corresponding to the second scanning stage may be greater than the duration corresponding to the first scanning stage. For example, when one frame of scanning signal is detected for 10s, the scanning duration corresponding to the first scanning stage may be, for example, 2s, 3s, or the like. The scanning duration corresponding to the second scanning stage may be, for example, 8s, 7s, or the like. When the scanning duration corresponding to the second scanning stage is set to be greater than the scanning duration corresponding to the first scanning stage, more signals can be detected at the effective scanning stage, so that the external signals can be effectively detected.

The phase difference between the reference signal and the frame scanning signal of the scanning vibrating mirror may be determined according to the current parameters of the reference signal and the signal parameters of the frame scanning signal.

For example, at a current moment, the reference signal period may be 5s, and the reference signal has been scanned for 3s in a current period, to be specific, a current first phase of the reference signal is $\theta1=3/5\times360°=216°$. For example, a frame scanning signal period of the scanning vibrating mirror may be 6s, and the frame scanning signal has been scanned for 3.4s in a current period, to be specific, a current second phase of the frame scanning signal of the scanning vibrating mirror is $\theta2=3.4/6\times360°=204°$. A phase difference between the reference signal and the frame scanning signal may be $\theta1-\theta2=216°-204°=12°$.

Step 104: Determining a scanning duration of the frame scanning signal at a first scanning stage in a next scanning period based on the phase difference, so that the frame scanning signal of the next scanning period and the reference signal tend to be synchronized.

In this embodiment, an absolute phase difference between the reference signal and the frame scanning signal of the scanning vibrating mirror needs to be reduced to synchronize the reference signal with the frame scanning signal of the scanning vibrating mirror. The duration corresponding to the first scanning stage of the frame scanning signal may be adjusted to adjust the absolute phase difference between the reference signal and the frame scanning signal of the scanning vibrating mirror.

The first scanning stage is an ineffective scanning stage. To be specific, a signal detected at the first scanning stage of the scanning vibrating mirror may be constructed to be an ineffective signal. In addition, the duration corresponding to the second scanning stage is set sufficiently. Therefore, a detection effect of the lidar may not be affected when the first scanning stage is set as the ineffective scanning stage.

The duration corresponding to the first scanning stage may be adjusted, so that the frame scanning signal including the first scanning stage and the second scanning stage and the reference signal tend to be synchronized.

In some application scenarios, the determining a scanning duration corresponding to a first scanning stage of the frame scanning signal in a next scanning period based on the phase difference may include: increasing or reducing the scanning duration corresponding to the first scanning stage by a preset quantity of resonant periods based on the phase difference.

Still using the example described above, the current first phase of the reference signal is $\theta1=216°$, the current second phase of the frame scanning signal of the scanning vibrating mirror is $\theta2=204°$, and the phase difference between the reference signal and the frame scanning signal is 12°. In other words, compared with the reference signal, a phase of the frame scanning signal of the scanning vibrating mirror is delayed by 12°. The duration corresponding to the first scanning stage in the next scanning period may be shortened to synchronize the reference signal with the frame scanning signal of the scanning vibrating mirror in the next scanning period. Assuming that the resonant period of the fast axis of the scanning vibrating mirror is 0.3s, the duration corresponding to the first scanning stage in the next scanning period of the scanning vibrating mirror may be shortened by 0.3s. Using an example in which a duration corresponding to a previous frame scanning period of the scanning vibrating mirror is 6s, and in the previous frame scanning period, a duration corresponding to the first scanning stage is 1.2s and a duration corresponding to the second scanning stage is 4.8s, in a next scanning period, a duration corresponding to the first scanning stage may be 1.2−0.3=0.9s, and a duration corresponding to the second scanning stage may be 4.8s. By analogy, a scanning duration of the first scanning stage of the frame scanning signal in a next scanning period of the scanning vibrating mirror may be adjusted by using a phase difference between the frame scanning signal and the reference signal in a previous scanning period of the scanning vibrating mirror.

In step 104, the scanning duration corresponding to the first scanning stage of the frame scanning signal in the next scanning period may be determined by using a preset zero-steady-state-error controller according to the phase difference.

The preset zero-steady-state-error controller may include, for example, an integral controller, a phase-locked loop controller, or the like.

Figure 2:
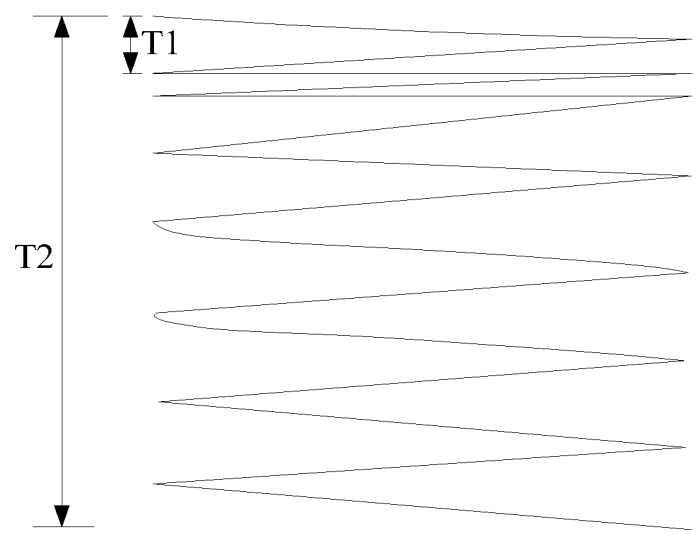
FIG. 2 is a schematic diagram of a scanning trajectory of an existing vibrating mirror for scanning.

Referring to FIG. 2, FIG. 2 shows a schematic diagram of a scanning trajectory of an existing scanning vibrating mirror.

Actually, a scanning track scanned by the scanning vibrating mirror is a point cloud map. Points are connected according to the scanning track of the scanning vibrating mirror to obtain the scanning trajectory of the scanning vibrating mirror shown in FIG. 2. The scanning vibrating mirror scans external objects under the joint action of the fast axis and the slow axis. A fast-axis scanning frequency may be 862.5 Hz, and an optical scanning angle may be 30°. A slow-axis scanning frequency may be 12.5 Hz, and an optical scanning angle may be 27.2°. A line quantity of the scanning trajectory of the scanning vibrating mirror is usually expected to remain constant. A ratio of the fast-axis scanning frequency to the slow-axis scanning frequency is usually a quantity of scanning lines included in the scanning trajectory. To be specific, a ratio of a slow-axis scanning period to a fast-axis scanning period is the quantity of scanning lines included in the scanning trajectory of the scanning vibrating mirror. For example, one fast-axis scanning period may be a period (T1 shown in the figure) in which a scanning trajectory moves from left to right and moves back to left; and one slow-axis scanning period may be a period (T2 shown in the figure) in which a scanning trajectory moves from bottom to top and then from bottom to top. As shown in FIG. 2, in the related art, the slow-axis scanning trajectory from top to bottom is usually set to T2/2.

Figure 3:
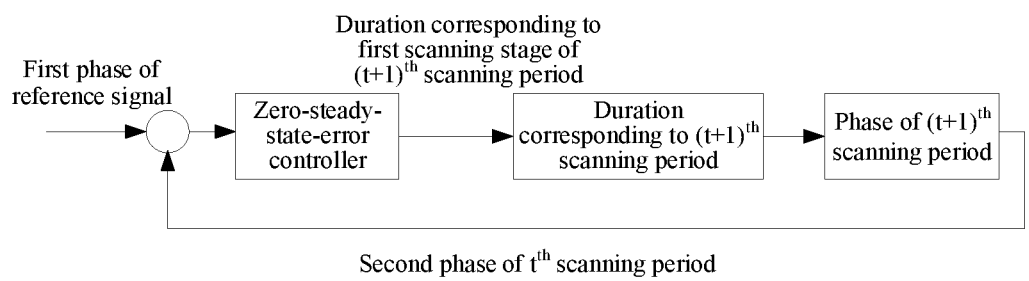
FIG. 3 is a schematic principle diagram of a frame synchronization method for a scanning vibrating mirror according to an embodiment of this disclosure.
Figure 4:
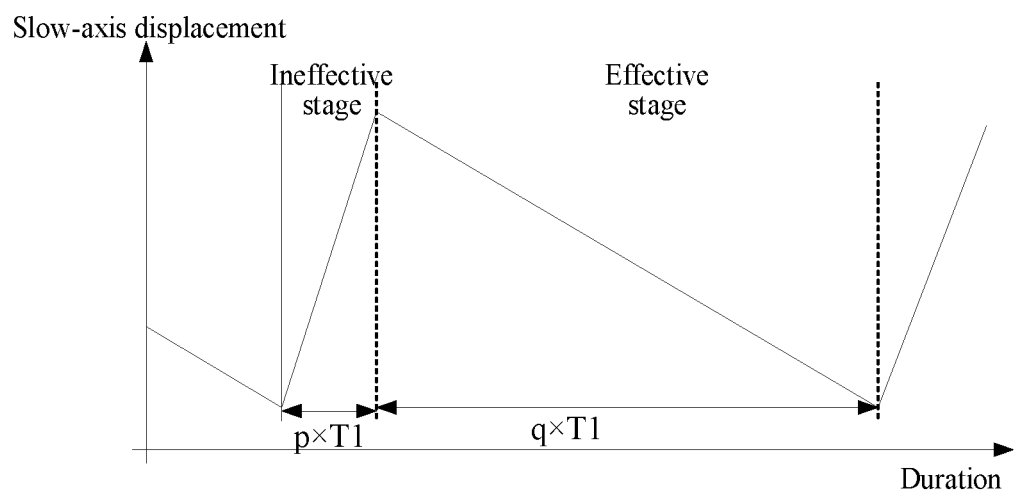
FIG. 4 is a schematic diagram of a frame scanning signal of the vibrating mirror for scanning according to the schematic principle diagram shown in FIG. 3.

Referring to FIG. 3 and FIG. 4, FIG. 3 shows a schematic principle diagram of a frame synchronization method for a scanning vibrating mirror according to this disclosure. FIG. 4 shows a schematic diagram of a frame scanning signal of the scanning vibrating mirror according to the schematic principle diagram shown in FIG. 3.

In terms of physical properties, metals have a property of thermal expansion and cold contraction, Young's modulus has temperature coefficients, and since the fast axis of the scanning vibrating mirror is operated in a resonance state, a fast-axis scanning frequency increases as the temperature rises and decreases as the temperature drops (according to theoretical analysis, a frequency fluctuation is about 2%, which will be greater in actual).

The frame scanning signal may be kept synchronized with external periodic signals to keep an unchanged scanning track of the scanning vibrating mirror and a stable scanning frequency of the frame scanning signal of the scanning vibrating mirror. The slow-axis scanning may be divided into an ineffective scanning period and an effective scanning period.

Using an example in which frame scanning is performed vertically in a reciprocal manner, a scanning period may be divided into a moving-up period and a moving-down period according to a direction of frame scanning movement. For example, the moving-down period is considered as an effective scanning stage, and the moving-up period is considered as an ineffective scanning stage (or vice versa).

Both a duration corresponding to the moving-up period and a duration corresponding to the moving-down period are integer multiples of a fast-axis (resonant-axis) scanning period (a resonant period), the multiples are set to p and q, and a start moment of effective scanning is considered as a frame start moment, in which p and q are positive integers greater than or equal to 1.

A phase of an external (a part herein is relative to scanner control, which may be generated by a module other than the lidar or another module in a lidar system) frame synchronization signal is used as a reference value, and phase information of the frame scanning signal of the scanning vibrating mirror is used as feedback.

Discretization is performed on the frame scanning period with a fast-axis resonant period (T1) as a unit. The discretized frame scanning period is divided into an effective scanning stage (that is, the second scanning stage described above) and an ineffective scanning stage (that is, the first scanning stage described above). A duration corresponding to the effective scanning stage is q×T1; and a duration corresponding to the ineffective scanning stage is p×T1. A value of q remains unchanged. A value of p is adjustable.

Any zero-steady-state-error controller may be used to synchronize the frame scanning signal of the scanning vibrating mirror with an external reference signal by using a discretized duration corresponding to the ineffective scanning stage (p×T1 herein) as a control output of the zero-steady-state-error controller.

Specifically, a reference signal period and a current first phase of the reference signal may be determined according to current parameters of a reference signal. Then, a second phase of the frame scanning signal of the $t^{th}$ frame scanning period of the scanning vibrating mirror is determined according to signal parameters of the frame scanning signal of a $t^{th}$ frame scanning period of the scanning vibrating mirror. A phase difference between the reference signal and the frame scanning signal of the scanning vibrating mirror in the $t^{th}$ frame scanning period is determined according to the current first phase and the second phase of the frame scanning signal of the $t^{th}$ frame scanning period. The phase difference is inputted into the zero-steady-state-error controller, and then a duration corresponding to a first scanning stage (an ineffective scanning stage) of a $(t+1)^{th}$ frame scanning period of the scanning vibrating mirror is determined by the zero-steady-state-error controller. A duration corresponding to the $(t+1)^{th}$ frame scanning period is determined according to the duration corresponding to the first scanning stage of the $(t+1)^{th}$ frame scanning period and a duration corresponding to a second scanning stage (an effective scanning stage) of a frame scanning period determined in a current scanning vibrating mirror operating state. Then, a second phase of the $(t+1)^{th}$ frame scanning period of the scanning vibrating mirror is generated. Finally, a phase difference between the reference signal and the frame scanning signal of the scanning vibrating mirror in the $(t+1)^{th}$ frame scanning period is determined according to the second phase of the $(t+1)^{th}$ frame scanning period of the scanning vibrating mirror and the first phase of the reference signal. Such a process is repeatedly performed, the duration corresponding to the first scanning stage (the ineffective scanning stage) of the scanning vibrating mirror is continuously adjusted, so that the frame scanning signal of the scanning vibrating mirror and the reference signal tend to be synchronized. By using the foregoing solutions, a scanning frame frequency is kept stable, and a duration corresponding to an ineffective scanning stage is adjusted based on closed-loop feedback, so that external frame synchronization signals are tracked and synchronized with an actual frame scanning period of the scanning vibrating mirror.

In addition, the value of q in the duration q×T1 corresponding to the effective scanning stage is determined to be a constant value, so that a waveform of an effective scanning stage of each frame scanning signal may remain consistent during generation of a reference waveform, and the scanning track of the effective scanning stage may remain consistent from frame to frame based on servo control, thereby keeping the track stable.

In some application scenarios, a fast-axis frequency of the scanning vibrating mirror is 1000 Hz, and a slow-axis frequency is 50 Hz. One frame of scanning trajectory may usually include 20 scanning lines. A frame period of the scanning vibrating mirror may be a period in which the scanning vibrating mirror scans from top to bottom and scans back from bottom to top. When a resonant frequency of the fast axis shifts, for example, the resonant frequency changes from 1000 Hz to 800 Hz, the slow-axis scanning frequency is usually adjusted to 40 Hz to maintain the same number of scanning lines included in each frame of scanning trajectory unchanged. However, the frame scanning frequency of 40 Hz cannot match external periodic signals. To match the external periodic signals, the frame scanning frequency of the scanning vibrating mirror is expected to be about 50 Hz. In other words, a duration corresponding to an entire scanning period is determined according to the frequency of the frame scanning signal. A common method is that, when the resonant frequency changes from 1000 Hz to 800 Hz, the slow-axis scanning frequency changes accordingly and is adjusted to 40 Hz to keep the line quantity of scanning lines included in each frame of scanning trajectory unchanged. In this way, the frame period of the entire frame scanning signal is prolonged. To match external signals, a duration corresponding to an effective scanning stage may be kept unchanged, and a scanning speed corresponding to an ineffective scanning stage is accelerated. The speed of acceleration is determined according to a reference signal period and a variation result of a resonant period. After the speed of the ineffective scanning stage is accelerated, the frame period of the frame scanning signal of the scanning vibrating mirror is generally unchanged and can be kept at 50 Hz. In this way, a frame scanning signal of a scanning vibrating mirror may synchronize with the external periodic signals while a scanning track of the scanning vibrating mirror is kept unchanged.

In the frame synchronization method for a scanning vibrating mirror provided according to the present disclosure, a frame scanning signal of the scanning vibrating mirror is divided into an effective scanning period and an ineffective scanning period, and a duration corresponding to the ineffective scanning period is adjusted to synchronize the frame scanning signal of the scanning vibrating mirror with external reference frame signals, so that a frequency of the frame scanning signal is matched with both a frequency of a line scanning signal of the scanning vibrating mirror and a frequency of the external reference frame signals. The frame scanning signal may be kept synchronized with external periodic signals while a frame scanning track and a frame scanning frequency of the frame scanning signal are kept stable.

In addition, an embodiment of this disclosure further provides a lidar. The lidar includes a scanning vibrating mirror. The lidar synchronizes the frame scanning signal of the scanning vibrating mirror with frame signals of other sensors cooperating with the lidar by performing the frame synchronization method for a scanning vibrating mirror provided in the embodiment shown in FIG. 1.

The lidar may be a solid-state lidar.

The lidar may be applied to an autonomous vehicle.

The foregoing descriptions are merely exemplary embodiments of this disclosure and descriptions of the applied technical principles. A person skilled in the art should understand that the scope of this disclosure is not limited to the technical solutions that are formed by the foregoing particular combinations of technical features, but shall also encompass other technical solutions formed by arbitrarily combining the foregoing technical features or equivalent features thereof without departing from the foregoing inventive concept. For example, technical solutions formed by replacing the foregoing features with technical features having similar functions disclosed in this disclosure (but not limited thereto) are also included.

What is claimed is:

1. A frame synchronization method for a scanning vibrating mirror, comprising:
    obtaining current parameters of a reference signal, wherein the current parameters of the reference signal comprise a reference signal period and a current first phase;
    obtaining signal parameters of a frame scanning signal of the scanning vibrating mirror along a first rotation axis of the scanning vibrating mirror, wherein the signal parameters of the frame scanning signal comprise a frame scanning period and a current second phase;
    determining a phase difference between the reference signal and the frame scanning signal based on the current parameters of the reference signal and the signal parameters of the frame scanning signal of a current scanning period; and
    determining a scanning duration corresponding to a first scanning stage of the frame scanning signal in a next scanning period based on the phase difference, so that the frame scanning signal of the next scanning period tend to be synchronized with the reference signal,
    wherein the frame scanning signal comprises the first scanning stage and a second scanning stage, and the scanning durations corresponding to the first scanning stage and a scanning duration corresponding to the second scanning stage are integer multiples of a resonant period of a resonant scanning signal of the scanning vibrating mirror along a second rotation axis of the scanning vibrating mirror.

2. The method according to claim 1, wherein a ratio between the scanning duration corresponding to the second scanning stage and the resonant period remains unchanged.

3. The method according to claim 1, wherein the scanning duration corresponding to the second scanning stage is greater than the scanning duration corresponding to the first scanning stage.

4. The method according to claim 1, wherein prior to obtaining the current parameters of the reference signal, the method further comprises:

dividing the frame scanning period into a plurality of resonant periods; and dividing the frame scanning period into the first scanning stage and the second scanning stage, wherein both the first scanning stage and the second scanning stage comprise the plurality of resonant periods;

wherein the scanning duration corresponding to the second scanning stage is fixed as a preset multiple of the resonant period; and wherein the scanning is performed along a first scanning direction at the first scanning stage, the scanning is performed along a second scanning direction at the second scanning stage, and the first scanning direction is opposite to the second scanning direction.

5. The method according to claim 1, wherein the determining the scanning duration corresponding to the first scanning stage of the frame scanning signal in the next scanning period based on the phase difference comprises:

determining, by using a preset zero-steady-state-error controller, the scanning duration corresponding to the first scanning stage of the frame scanning signal in the next scanning period according to the phase difference.

6. The method according to claim 5, wherein the preset zero-steady-state-error controller comprises an integral controller and a phase-locked loop controller.

7. The method according to claim 5, wherein the determining the scanning duration corresponding to the first scanning stage of the frame scanning signal in the next scanning period based on the phase difference comprises:

increasing or reducing the scanning duration corresponding to the first scanning stage by a preset quantity of resonant periods based on the phase difference.

8. A lidar comprising a scanning vibrating mirror, wherein the lidar synchronizes a frame scanning signal of the scanning vibrating mirror with frame signals of other sensors cooperating with the lidar by performing a frame synchronization method for a scanning vibrating mirror, the frame synchronization method comprising:

obtaining current parameters of a reference signal, wherein the current parameters of the reference signal comprise a reference signal period and a current first phase;

obtaining signal parameters of a frame scanning signal of the scanning vibrating mirror along a first rotation axis of the scanning vibrating mirror, wherein the signal parameters of the frame scanning signal comprise a frame scanning period and a current second phase;

determining a phase difference between the reference signal and the frame scanning signal based on the current parameters of the reference signal and the signal parameters of the frame scanning signal of a current scanning period; and determining a scanning duration corresponding to a first scanning stage of the frame scanning signal in a next scanning period based on the phase difference, so that the frame scanning signal of the next scanning period tend to be synchronized with the reference signal, wherein wherein the frame scanning signal comprises the first scanning stage and a second scanning stage, and the respective scanning durations corresponding to the first scanning stage and a scanning duration corresponding to the second scanning stage are integer multiples of a resonant period of a resonant scanning signal of the scanning vibrating mirror along a second rotation axis of the scanning vibrating mirror.

9. The lidar according to claim 8, wherein a ratio between the scanning duration corresponding to the second scanning stage and the resonant period remains unchanged.

10. The lidar according to claim 8, wherein the scanning duration corresponding to the second scanning stage is greater than the scanning duration corresponding to the first scanning stage.

11. The lidar according to claim 8, wherein prior to obtaining the current parameters of the reference signal, the frame synchronization method further comprises:

dividing the frame scanning period into a plurality of resonant periods; and dividing the frame scanning period into the first scanning stage and the second scanning stage, wherein both the first scanning stage and the second scanning stage comprise the plurality of resonant periods;

wherein the scanning duration corresponding to the second scanning stage is fixed as a preset multiple of the resonant period; and wherein the scanning is performed along a first scanning direction at the first scanning stage, and the scanning is performed along a second scanning direction at the second scanning stage, and the first scanning direction being is opposite to the second scanning direction.

12. The lidar according to claim 8, wherein the determining the scanning duration corresponding to the first scanning stage of the frame scanning signal in the next scanning period based on the phase difference comprises:

determining, by using a preset zero-steady-state-error controller, the scanning duration corresponding to the first scanning stage of the frame scanning signal in the next scanning period according to the phase difference.

13. The lidar according to claim 12, wherein the preset zero-steady-state-error controller comprises an integral controller and a phase-locked loop controller.

14. The lidar according to claim 12, wherein the determining the scanning duration corresponding to the first scanning stage of the frame scanning signal in the next scanning period based on the phase difference comprises:

increasing or reducing the scanning duration corresponding to the first scanning stage by a preset quantity of resonant periods based on the phase difference.

* * * * *